United States Patent
Nakajima

(10) Patent No.: US 9,890,927 B2
(45) Date of Patent: *Feb. 13, 2018

(54) VEHICULAR DISPLAY APPARATUS

(71) Applicant: YAZAKI CORPORATION, Tokyo (JP)

(72) Inventor: Harutoshi Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,820

(22) Filed: Oct. 19, 2016

(65) Prior Publication Data
US 2017/0106785 A1    Apr. 20, 2017

(30) Foreign Application Priority Data

Oct. 20, 2015  (JP) .................................. 2015-206130

(51) Int. Cl.
| F21V 7/05 | (2006.01) |
| F21V 7/00 | (2006.01) |
| G01D 11/28 | (2006.01) |
| B60Q 3/10 | (2017.01) |

(52) U.S. Cl.
CPC ................ F21V 7/05 (2013.01); B60Q 3/10 (2017.02); F21V 7/0008 (2013.01); G01D 11/28 (2013.01)

(58) Field of Classification Search
CPC . F21V 7/05; F21V 7/0008; B60Z 3/10; G01D 11/20
USPC .............. 362/296.09, 516, 489, 23.01–23.22
See application file for complete search history.

(56) References Cited

U.S. PATENT DOCUMENTS

| 7,755,601 B2 | 7/2010 | Yokota et al. | |
| 2006/0092098 A1 | 5/2006 | Yokota et al. | |
| 2008/0123322 A1* | 5/2008 | Tane ..................... | B60K 35/00 362/23.01 |
| 2010/0039796 A1* | 2/2010 | Mukawa ................. | G02B 5/18 362/97.1 |
| 2014/0036472 A1* | 2/2014 | Ishihara; Hideo ...... | F21V 33/00 362/23.14 |

(Continued)

FOREIGN PATENT DOCUMENTS

| JP | 2006-132951 A | 5/2006 |
| JP | 2009-192434 A | 8/2009 |

(Continued)

OTHER PUBLICATIONS

Japanese Office Action for the related Japanese Patent Application No. 2015-206130 dated Nov. 7, 2017.

*Primary Examiner* — Laura Tso
(74) *Attorney, Agent, or Firm* — Kenealy Vaidya LLP

(57) ABSTRACT

A vehicular display apparatus can be provided on a vehicular instrument panel and the apparatus provides a display for a vehicular crew. The apparatus can include; a half mirror located at a back side of the vehicle with respect to the liquid crystal display, the half mirror configured to transmit an image from the liquid crystal display to the back of the vehicle, and to reflect light from a direction intersecting with a front-back direction of the vehicle to the back of the vehicle, a first decorative member located at a side of the intersecting direction, and a light emitting member configured to irradiate light at least one of from and towards the first decorative member.

4 Claims, 9 Drawing Sheets

(56) References Cited

U.S. PATENT DOCUMENTS

2015/0015457 A1* 1/2015 Takasu .................. G02B 27/01
 345/7
2016/0016472 A1* 1/2016 Konishi ................ B60K 35/00
 345/633

FOREIGN PATENT DOCUMENTS

| JP | 2010078322 | * | 4/2010 |
| JP | 2014-228391 A | | 12/2014 |
| JP | 2015132583 | * | 7/2015 |
| JP | 2014228391 | * | 4/2017 |

* cited by examiner

VEHICULAR DISPLAY APPARATUS

CROSS REFERENCE TO RELATED APPLICATION

This application claims the priority benefit under 35 U.S.C. § 119 to Japanese Patent Application No. 2015-206130 filed on Oct. 20, 2015, the contents of which are incorporated herein by reference.

BACKGROUND

1. Technical Field

The disclosed subject matter relates to a vehicular display apparatus which is formed on a vehicular instrument panel and which also provides a display for a vehicular crew.

2. Background Art

A conventional vehicular display apparatus having a decorative member on the front of a liquid crystal display is described, for example, in Patent Reference 1 listed below. In this conventional vehicular display apparatus, the decorative member is an actual three-dimensional body, with the result that a vehicular display with good appearance can be provided by displaying an image by the liquid crystal display while representing a third dimension difficult to be represented in the liquid crystal display by the three-dimensional body.

Patent Reference 1 is JP-A-2006-132951.

In the conventional vehicular display apparatus, the front of the liquid crystal display is provided with the decorative member, with the result that there are cases where in the case of displaying an image, the decorative member becomes an obstacle and the display cannot be provided. Hence, it is also contemplated to display an image of the decorative member by the liquid crystal display, but in this case, representation of a third dimension becomes less sufficient than a three-dimensional body, and appearance is decreased.

SUMMARY

The disclosed subject matter is directed towards, recognizes, and in certain cases solves the above-referenced problems of the conventional art. One benefit that can be associated with certain embodiments of the disclosed subject matter is to provide a vehicular display apparatus capable of preventing a decorative member from becoming an obstacle in the case of displaying a screen while inhibiting a decrease in appearance.

A vehicular display apparatus according to one embodiment of the disclosed subject matter can include a vehicular display apparatus which is provided on a vehicular instrument panel and also provides a display for a vehicular crew, the apparatus including a liquid crystal display that projects an image toward a back of a vehicle, a half mirror that is provided on a back side of the vehicle with respect to the liquid crystal display, transmits an image from the liquid crystal display to the back of the vehicle, and reflects light from a direction intersecting with a front-back direction of the vehicle to the back of the vehicle, a first decorative member provided to a side of the intersecting direction, and a light emitting member that irradiates the first decorative member with light or emits light from an inside of the first decorative member.

Also, an exemplary vehicular display apparatus according to the disclosed subject matter can further include a second decorative member provided between the liquid crystal display and the half mirror. When the light emitting member emits the light, the first decorative member is represented as a member continuous with the second decorative member.

Also, in an exemplary vehicular display apparatus according to the disclosed subject matter, the second decorative member can include at least one ring member having a C shape, and the first decorative member can include at least one arcuate member with a length joining a C-shaped open portion of the second decorative member. When the light emitting member emits light, the arcuate member is displayed so as to connect the C-shaped open portion of the ring member having the C shape to thereby display a ring having an O shape, and when the light emitting member does not emit light, one image display area, by the liquid crystal display, in which an inside and an outside of the ring member having the C shape are joined through the C-shaped open portion is formed.

Also, in an exemplary vehicular display apparatus according to the disclosed subject matter, the second decorative member can have the two ring members, and the two ring members can be arranged with the C-shaped open portions facing mutually, and the first decorative member can have the two arcuate members, and when the light emitting member emits light, the two arcuate members are displayed so as to connect the C-shaped open portions of the two ring members having the C shapes to thereby display the two rings having the O shapes, and when the light emitting member does not emit light, the one image display area in which regions of the insides of the two C-shaped ring members with the open portions facing mutually are mutually joined is formed.

The vehicular display apparatus of the disclosed subject matter can prevent the decorative member from becoming an obstacle in the case of displaying a screen while inhibiting a decrease in appearance.

DETAILED DESCRIPTION OF EXEMPLARY EMBODIMENTS

The disclosed subject matter will hereinafter be described with respect to exemplary embodiments, but the disclosed subject matter is not limited to the following embodiments, and changes may be made without departing from the gist of the disclosed subject matter, and certain features and techniques of each of the embodiments may be combined with other features/techniques in the possible scope of the disclosed subject matter.

Figure 1:
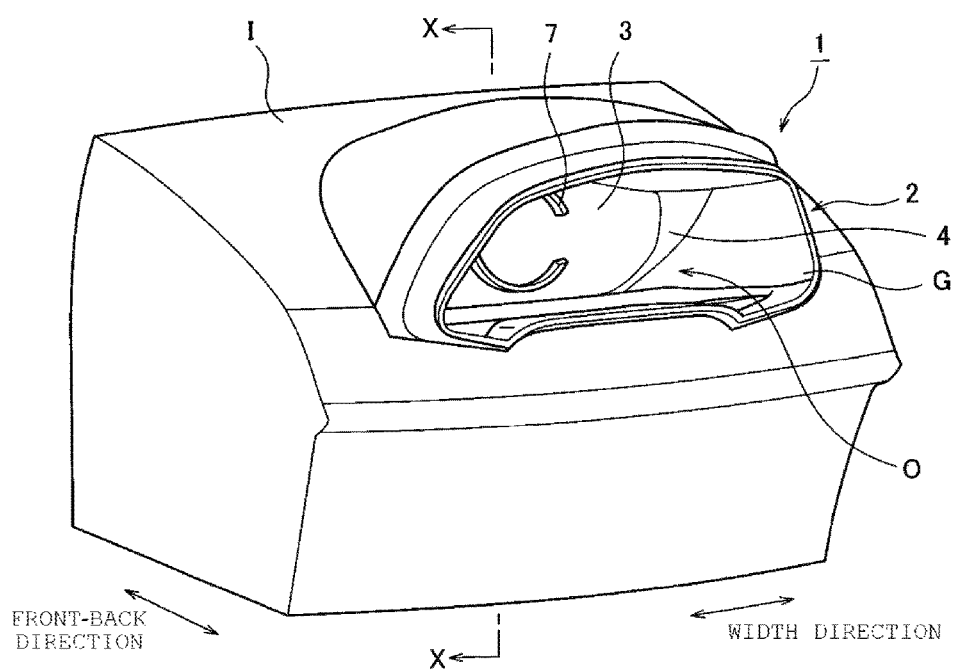
FIG. 1 is a perspective view showing a vehicular display apparatus according to a first embodiment of the disclosed subject matter.
Figure 2:
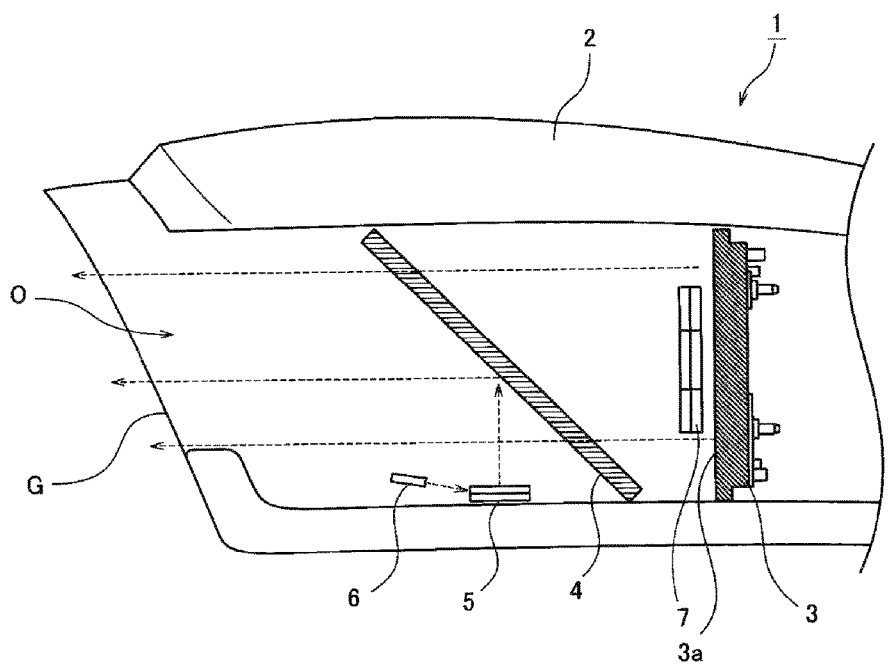
FIG. 2 is a sectional view taken along line X-X shown in FIG. 1.

FIG. 1 is a perspective view showing a vehicular display apparatus according to a first embodiment of the disclosed subject matter, and FIG. 2 is a sectional view taken along line X-X shown in FIG. 1. A vehicular display apparatus 1 shown in FIGS. 1 and 2 has a case 2 formed integrally to a vehicular instrument panel I, and displays an image toward a vehicular crew through an opening O of the case 2. In addition, the side (that is, the back side of a vehicle) of the vehicular crew in the opening O of the case 2 can be provided with a front glass plate G.

Such a vehicular display apparatus 1 can include an image emitting device such as a liquid crystal display 3, a half mirror 4, a first decorative member (decorative member) 5, a light emitting member 6, and a second decorative member 7 inside the case 2.

The liquid crystal display 3 can be the so-called TFT-LCD (Thin Film Transistor Liquid Crystal Display: one example of the liquid crystal display 3), and is constructed so that a display surface 3a faces to the back of the vehicle and an image is projected toward the back of the vehicle.

The half mirror 4 is formed between the liquid crystal display 3 and the vehicular crew, that is, in the back side of the liquid crystal display 3 inside the case 2, and is a plate-shaped member having transmission and reflection functions. This half mirror 4 can be installed in a state inclined to a front-back direction of the vehicle. That is, the half mirror 4 can be arranged with a surface of the half mirror 4 set slightly downwardly so that the lower side of the half mirror 4 is nearer to the front of the vehicle. Such a half mirror 4 is constructed so that an image from the liquid crystal display 3 is transmitted to the back of the vehicle and also light from a direction (downward direction in the present embodiment) intersecting with the front-back direction of the vehicle is reflected to the back of the vehicle.

The first decorative member 5 can be a member (for example, a resin member (a metallic coating is applied to a surface of the member)) formed to the side of the intersecting direction, and formed under the half mirror 4 arranged in the inclined state. The light emitting member 6 is, for example, a Light Emitting Diode (LED) element, and is a member for irradiating the first decorative member 5 with light. When the light emitting member 6 irradiates the first decorative member 5 with light, the light from the light emitting member 6 is reflected on the first decorative member 5. This reflected light is further reflected toward the back of the vehicle by the half mirror 4, and reaches the side of the vehicular crew through the front glass plate G. That is, when the light emitting member 6 emits light, the vehicular crew can recognize the first decorative member 5. At this time, the first decorative member 5 can appear to the vehicular crew as if it were present in the back side of the half mirror 4, that is, the installation side of the liquid crystal display 3, and thus a virtual image is displayed. On the other hand, when the light emitting member 6 does not emit light, the first decorative member 5 does not appear to or is not recognized by the vehicular crew. Consequently, the first decorative member 5 is apparent (or not apparent) to the vehicular crew according to a state in which the light emitting member 6 emits or does not emit light.

The second decorative member 7 can be a member (for example, a resin member (a metallic coating is applied to a surface of the member)) formed between the liquid crystal display 3 and the half mirror 4. This second decorative member 7 can be visually recognized by projection light in the case of displaying an image by the liquid crystal display 3. The vehicular crew recognizes the second decorative member 7 together with the display of the image by the liquid crystal display 3.

Figure 3:
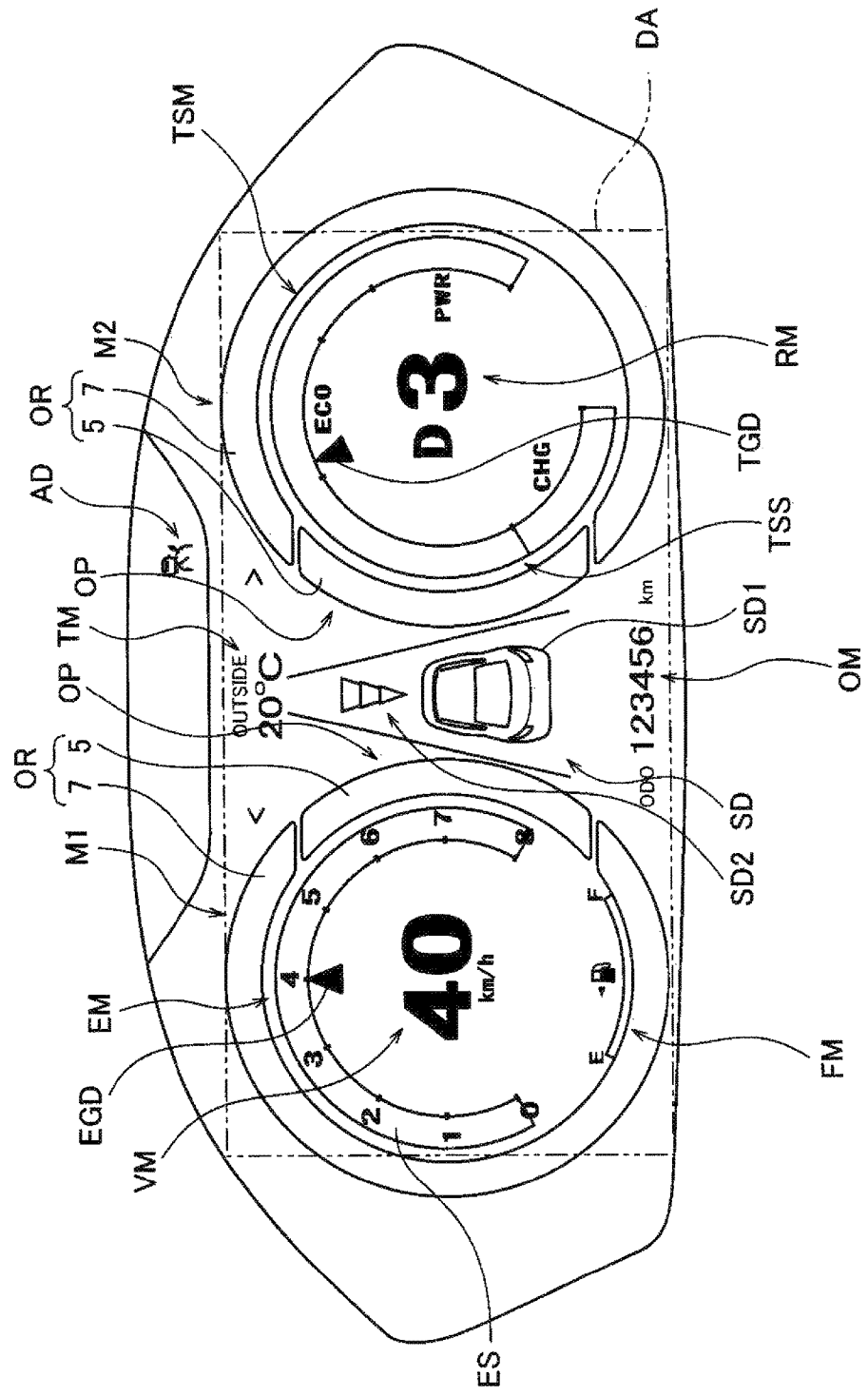
FIG. 3 is a front view showing one example of a display form by the vehicular display apparatus according to the embodiment of FIG. 1.

FIG. 3 is a front view showing one example of a display form by the vehicular display apparatus 1 according to the embodiment of FIG. 1. In addition, FIG. 3 shows a display example in a state in which the light emitting member 6 emits light.

As shown in FIG. 3, the vehicular display apparatus 1 can include a first instrument M1 integrally having a speedometer VM, a fuel gauge FM and an engine tachometer EM, a second instrument M2 integrally having a shift lever indicator RM and a running state indicator TSM, an outside air temperature indicator TM, an odometer OM, an auto cruise indicator SD which are displayed inside a display area DA of the liquid crystal display 3. Further, the vehicular display apparatus 1 can include an alarm indicator AD, for example, for indicating the alarm contents at the time of occurrence of an alarm item on the outside of the display area DA of the liquid crystal display 3.

The first instrument M1 can be an annular instrument, and can include an O ring OR indicating an instrument frame. The speedometer VM can be configured to display a vehicle speed in a position of the center of the O ring OR by a numerical value, and in the example shown in FIG. 3, the vehicle speed is displayed by, for example, "40 km/h". The fuel gauge FM includes an arcuate (lower side) fuel scale displayed along an inside portion of the O ring OR, and a fuel bar indicating the present remaining fuel.

The engine tachometer EM can include an engine revolution scale ES with an arcuate shape (an arcuate shape excluding the lower side) displayed along the inside portion of the O ring OR, and a pointing indicator EGD with, for example, a triangle indicating the number of revolutions of the present engine.

Like the first instrument M1, the second instrument M2 can be an annular instrument, and an O ring OR indicating an instrument frame is displayed. In addition, the first instrument M1 can be arranged slightly near to the vehicular crews' left, and the second instrument M2 can be arranged slightly near to the vehicular crews' right. The shift lever indicator RM displays a shift position in a position of the center of the O ring OR by an alphabet and a numerical value, and in the example shown in FIG. 3, the shift position is displayed by, for example, "D3" (a drive position of a third gear).

The running state indicator TSM is an instrument indicating whether the running state of the vehicle is a charging state of electric power, an eco driving state or a power driving state, and can include a running state scale TSS with an arcuate shape (an arcuate shape excluding the right lower side) displayed along the inside portion of the O ring OR, and a pointing indicator TGD with, for example, a triangle indicating the present running state.

The outside air temperature indicator TM indicates an air temperature of the outside of the vehicle, and can be displayed on the slightly upper side between the first and second instruments M1, M2. The odometer OM indicates an integrated running distance of the vehicle, and can be displayed on the slightly lower side between the first and second instruments M1, M2. The alarm indicator AD indicates the alarm contents at the time of occurrence of an alarm item and can be located on the further upper side than outside air temperature indicator TM.

The auto cruise indicator SD indicates information about an auto cruising function. Here, the auto cruising function is a function of running with a distance to a leading vehicle maintained constant without stepping on an accelerator pedal. In the example shown in FIG. 3, an own vehicle indicator SD1 and an inter-vehicle distance indicator SD2 are displayed. The inter-vehicle distance indicator SD2 includes three scales by which the distance to the leading vehicle is displayed in three steps of "long, middle, short", and is configured to increase or decrease the number of scales turned on according to the set inter-vehicle distance.

In such a display state, the O rings OR described above can be represented as one continuous member by integration of the second decorative member 7 and the first decorative member 5 displayed as a virtual image. More specifically, the second decorative member 7 is two ring members having C shapes in front view, and the first decorative member 5 includes two arcuate members for joining C-shaped open portions OP, and when the light emitting member 6 emits light, these members 5, 7 are integrated and are displayed as the two O rings OR. In this manner, each of the O rings OR is represented by an actual three-dimensional body of the second decorative member 7 and the first decorative member 5, with the result that the instruments M1, M2 can be displayed with good appearance. In addition, portions other than the O rings OR and the alarm indicator AD in the example shown in FIG. 3 are represented by images displayed by the liquid crystal display 3.

Here, the second decorative member 7 is the two ring members arranged with the C-shaped open portions OP facing mutually with respect to each other, but the configuration is not limited to this, and may for example be one ring member. Also, the first decorative member 5 may similarly include one arcuate member.

Figure 4:
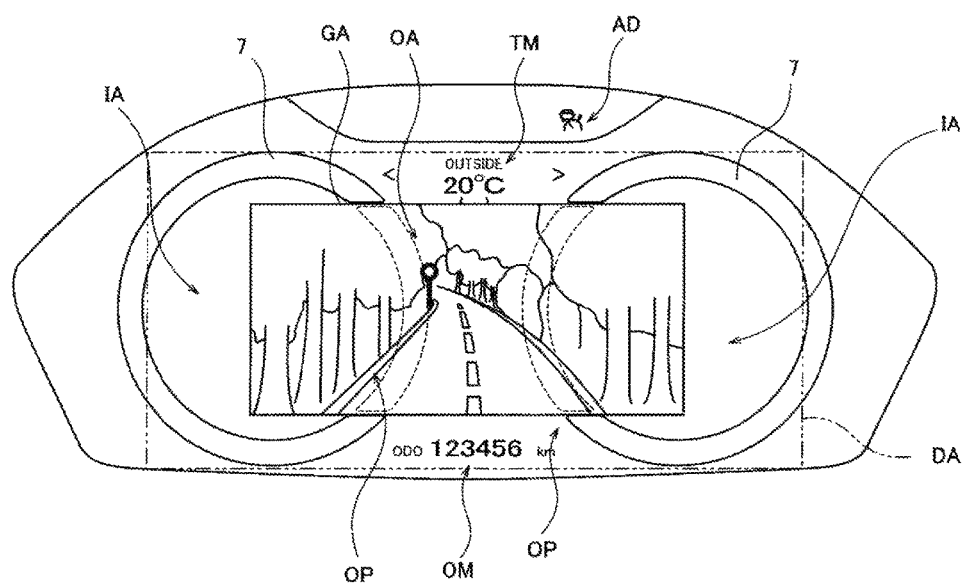
FIG. 4 is a front view showing another example of the display form by the vehicular display apparatus according to the embodiment of FIG. 1.

FIG. 4 is a front view showing another example of the display form by the vehicular display apparatus 1 according to the embodiment of FIG. 11. In addition, FIG. 4 shows a display example in a state in which the light emitting member 6 does not emit light. In addition, a broken line in FIG. 4 shows an area in which the first decorative member 5 is displayed.

As shown in FIG. 4, when the light emitting member 6 does not emit light, the first decorative member 5 is not recognized. As a result, the vehicular display apparatus 1 provides a large-screen display by the liquid crystal display 3 using the fact that the first decorative member 5 is not recognized.

That is, as shown in FIG. 4, the inside IA and the outside OA of the second decorative member 7 which is the ring members having the C shapes form one image display area GA joined through the open portions OP of the ring members. The vehicular display apparatus 1 displays, for example, a vehicle outside image of the front side of the vehicle using this image display area GA. Accordingly, a relatively large image area can be obtained through the inside IA and the outside OA of the second decorative member 7.

In addition, the image display area GA may be an area for joining the inside IA to the outside OA of the second decorative member 7 in one of the first instrument M1 and the second instrument M2, but can be one image display area GA for mutually joining the insides IA of the two ring members with the open portions OP facing mutually with respect to each other like the example shown in FIG. 4. This is because a wider image display area can be obtained.

Next, an exemplary operation of the vehicular display apparatus 1 according to the first embodiment will be described. First, the vehicular display apparatus 1 decides the contents to be displayed. In the case of deciding that an instrument image should be displayed according to this decided result, as shown in FIG. 3, the vehicular display apparatus 1 makes the light emitting member 6 emit light, and displays the O rings OR made of the first and second decorative members 5, 7 for the vehicular crew, and also controls the liquid crystal display 3 to display the speedometer VM etc. inside the O rings OR. Also, the vehicular display apparatus 1 can properly display desired information (the odometer OM etc.) on the outside of the O rings OR.

On the other hand, in the case when it is decided that a large-screen display should be provided, the vehicular display apparatus 1 does not display the first decorative member 5 for the vehicular crew by changing to a state in which the light emitting member 6 does not emit light, and displays a predetermined image (for example, an image of the front of the vehicle shown in FIG. 4) in the image display area GA for joining the inside IA and the outside OA of the ring members (the second decorative member 7) having the C shapes. In this case, a speed may be displayed in a display place of the outside air temperature indicator TM or the odometer OM.

Thus, in the vehicular display apparatus 1 according to the first embodiment, when the light emitting member 6 emits light, the light from the first decorative member 5 is reflected by the half mirror 4, and the vehicular crew of the back side of the vehicle can recognize the first decorative member 5. Also, since light from the liquid crystal display 3 passes through the half mirror 4 and is displayed to the vehicular crew of the back side of the vehicle, a decrease in appearance can be inhibited by displaying an image with a third dimension of a three-dimensional body represented. Moreover, when the light emitting member 6 does not emit light, the vehicular crew does not recognize the first decorative member 5, and the first decorative member 5 can be prevented from becoming an obstacle when the vehicular crew recognizes an image from the liquid crystal display 3. Consequently, the first decorative member 5 can be prevented from becoming the obstacle in the case of displaying a screen while inhibiting the decrease in appearance.

Also, the second decorative member 7 formed between the liquid crystal display 3 and the half mirror 4 can be further included, and when the light emitting member 6 emits the light, the first decorative member 5 is represented as a member continuous with the second decorative member 7, with the result that a part of the member is used as the first decorative member 5 and the remaining part is used as the second decorative member 7 and thereby, when the light emitting member 6 emits light, the continuous member can be represented and when the light emitting member 6 does not emit light, the vehicular crew does not recognize the first decorative member 5, and the first decorative member 5 can be prevented from becoming an obstacle when the vehicular crew recognizes the image from the liquid crystal display 3.

Also, the second decorative member 7 can be formed as a ring member having a C shape, and the first decorative member 5 can be formed as an arcuate member with a length joining the C-shaped open portion OP of the second decorative member 7. When the light emitting member 6 emits light, the arcuate member is displayed so as to apparently connect the C-shaped open portion OP of the ring member having the C shape to thereby display the O ring OR having an O shape to the vehicular crew, with the result that when the light emitting member 6 emits light, for example, the O ring OR often used in the speedometer, the engine tachometer, etc. can be represented, and when the light emitting member 6 does not emit light, the C ring is represented and the relatively large image area GA using the C-shaped open portion OP can be obtained.

Also, the second decorative member 7 can include two ring members, and the two ring members can be arranged with the C-shaped open portions OP mutually facing each other, and the first decorative member 5 can include two arcuate members, and when the light emitting member 6 emits light, the two arcuate members are displayed so as to appear to connect the C-shaped open portions OP of the two ring members having the C shapes to thereby display the two O rings OR having the O shapes to the vehicular crew, and when the light emitting member 6 does not emit light, the one image display area GA in which regions of the insides IA of the two C-shaped ring members with the open portions OP facing mutually are mutually joined is formed. As a result, while displaying the instruments such as the speedometer and the engine tachometer in which the two O rings OR are represented, as desired, the light emitting member 6 does not emit light, and the regions of the insides IA of the two C-shaped ring members with the open portions OP facing mutually with respect to each other form the one image display area GA by the liquid crystal display 3, and a relatively large image area can be obtained.

Next, a second embodiment of the disclosed subject matter will be described. A vehicular display apparatus according to the second embodiment can be similar to that of the first embodiment, but can differ from that of the first embodiment in a part of the contents. Hereinafter, an exemplary difference between the second embodiment and the first embodiment will be described.

Figure 5:
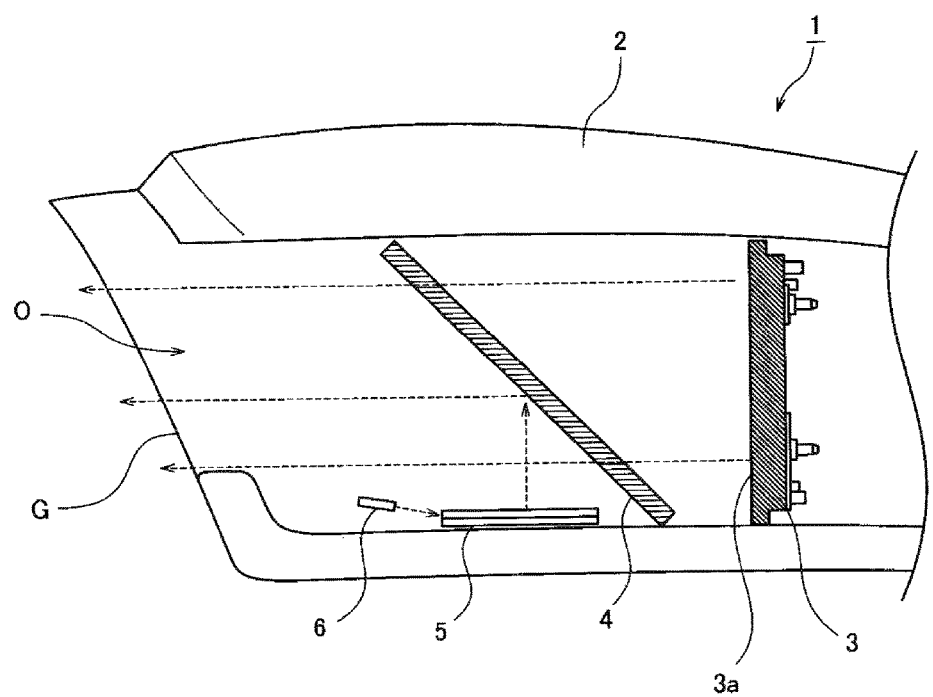
FIG. 5 is a sectional view showing a vehicular display apparatus according to a second embodiment.

FIG. 5 is a sectional view showing a vehicular display apparatus 1 according to the second embodiment. As shown in FIG. 5, a vehicular display apparatus 1 according to the second embodiment can be constructed so that a second decorative member 7 is not included between a liquid crystal display 3 and a half mirror 4. Also, the whole display area DA of the liquid crystal display 3 can substantially correspond to a display area of the vehicular display apparatus 1, and an alarm indicator AD can also be configured to be displayed by an image. The other configuration can be similar to that of the first embodiment.

Figure 6:
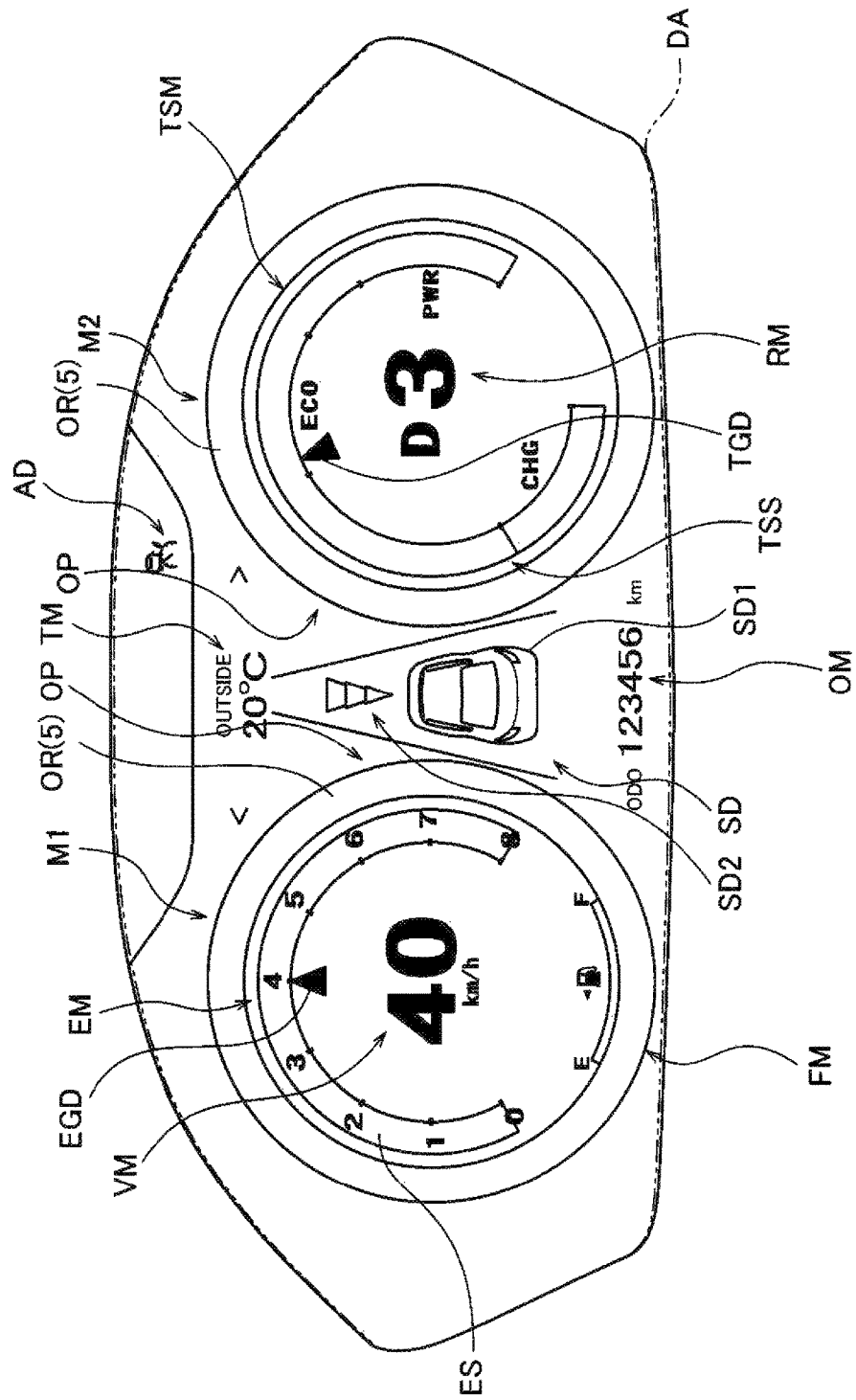
FIG. 6 is a front view showing one example of a display form by the vehicular display apparatus according to the second embodiment.

FIG. 6 is a front view showing one example of a display form by the vehicular display apparatus 1 according to the second embodiment. In addition, FIG. 6 shows a display example in a state in which a light emitting member 6 emits light.

As shown in FIG. 6, the vehicular display apparatus 1 displays a first instrument M1, a second instrument M2, etc. like the first embodiment. Each of these instruments M1, M2 includes an O ring OR indicating an instrument frame. In a vehicular display apparatus 1 according to the second embodiment, the whole O ring OR is displayed as a virtual image. That is, a first decorative member 5 is arranged in the lower side of the half mirror 4 as the O-shaped O ring OR itself.

Because of such a configuration, when the light emitting member 6 emits light, the O ring OR is displayed like the first embodiment, but when the light emitting member 6 does not emit light, the whole O ring OR is not displayed. Accordingly, a vehicular display apparatus 1 according to the second embodiment can provide a larger-screen display.

Figure 7:
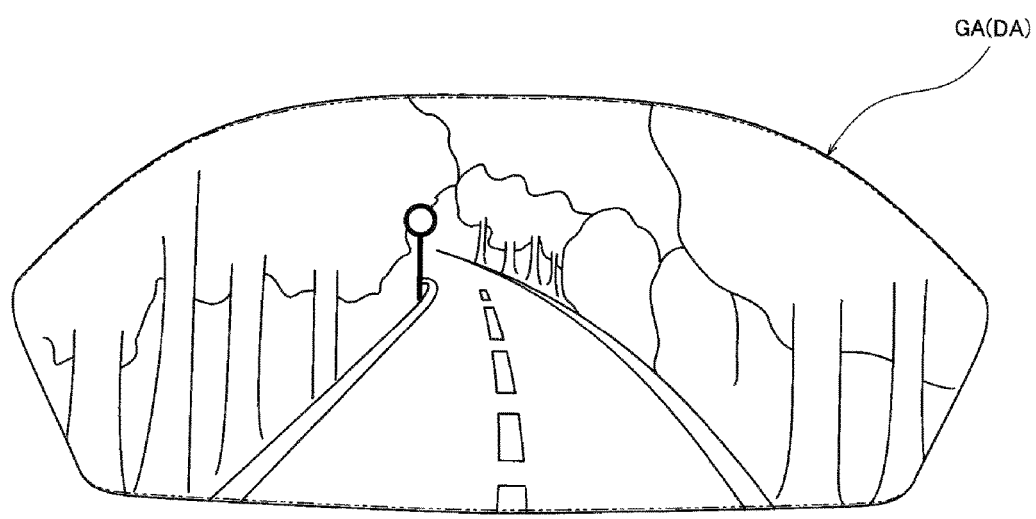
FIG. 7 is a front view showing another example of the display form by the vehicular display apparatus according to the second embodiment.

FIG. 7 is a front view showing another example of the display form by the vehicular display apparatus 1 according to the second embodiment. In addition, FIG. 7 shows a display example in a state in which the light emitting member 6 does not emit light.

As shown in FIG. 7, in a vehicular display apparatus 1 according to the second embodiment, when the light emitting member 6 does not emit light, the whole O ring OR is not recognized, with the result that the whole can be used as an image display area GA for displaying an image of the front of a vehicle. Accordingly, a larger-screen display can be provided.

Thus, in a vehicular display apparatus 1 according to the second embodiment, the first decorative member 5 can be prevented from becoming an obstacle in the case of displaying a screen thereby inhibiting a decrease in appearance, like the first embodiment.

Further, according to the second embodiment, when the light emitting member 6 does not emit light, the first decorative member 5 is not displayed and also the second decorative member 7 is not included (that is, the decorative member which is an actual three-dimensional body can be only the first decorative member 5), with the result that a display by the whole liquid crystal display 3 etc. can be provided, and a larger-screen display can be provided.

Figure 9:
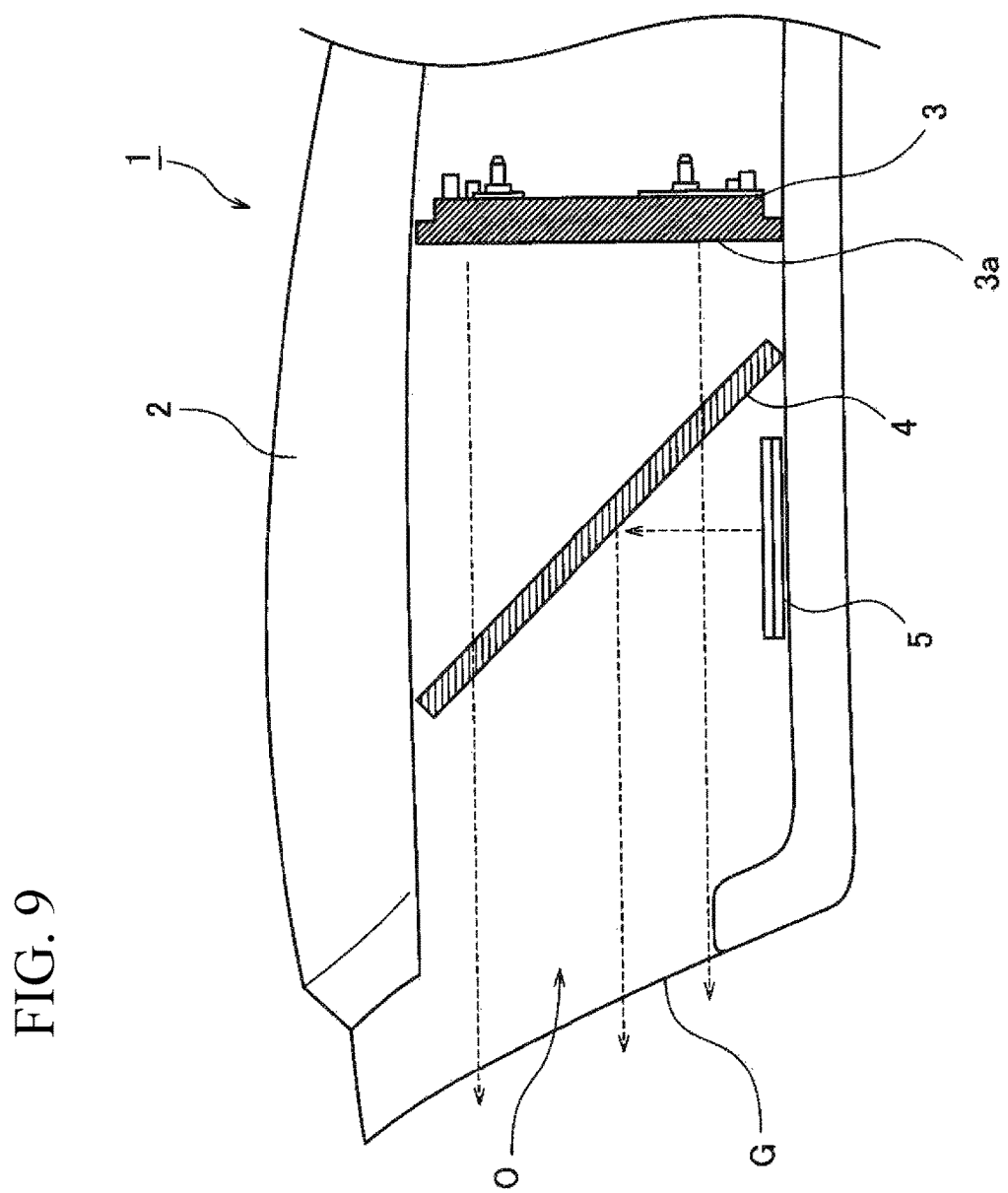
FIG. 9 is a sectional view showing a modification of the vehicular display apparatus according to FIG. 5.

FIG. 9 shows a modification of the vehicular display apparatus 1 of FIG. 5 that includes a case 2, a liquid crystal display 3, a half mirror 4, a first decorative member 5, a front glass plate G and an opening 0, as discussed above with respect to FIGS. 5-7. The vehicular display apparatus 1 further includes a light emitting member configured to irradiate light from the first decorative member 5.

Next, a third embodiment of the disclosed subject matter will be described. A vehicular display apparatus according to the third embodiment can be similar to that of the second embodiment, but differs from that of the second embodiment in a part of the contents. Hereinafter, a difference between the third embodiment and the second embodiment will be described.

Figure 8:
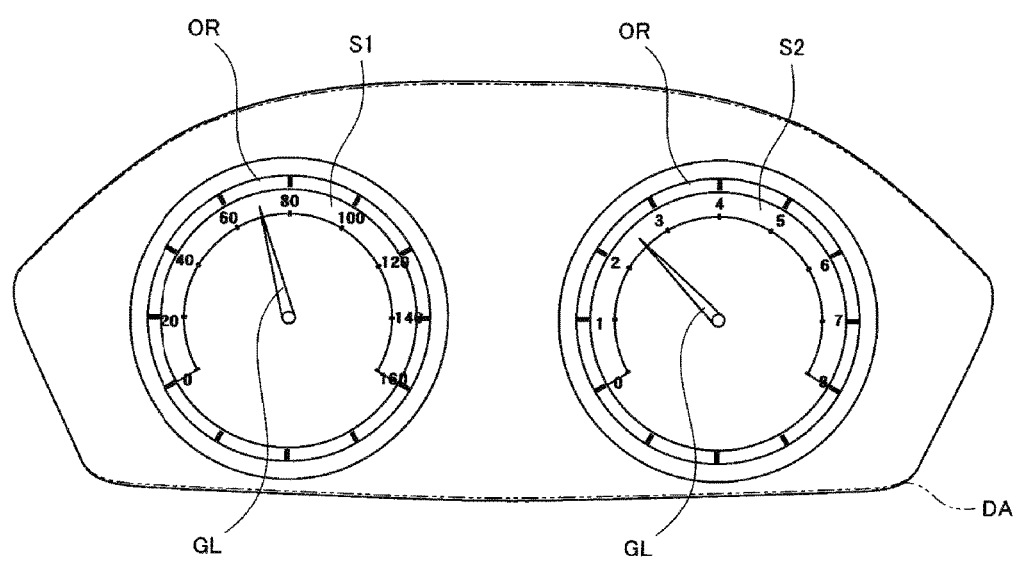
FIG. 8 is a front view showing one example of a display form by a vehicular display apparatus according to a third embodiment.

FIG. 8 is a front view showing one example of a display form by a vehicular display apparatus 1 according to the third embodiment. In addition, FIG. 8 shows a display example in a state in which a light emitting member 6 emits light.

In the example shown in FIG. 8, a first decorative member 5 is pointers GL, and O rings OR and scales S1, S2 are represented by displaying an image by a liquid crystal display 3. Since the first decorative member 5 is the pointers GL, the third embodiment includes a mechanism for driving the pointer GL and the pointer GL in the lower side of a half mirror 4. Also, the third embodiment is constructed so that the light emitting member 6 irradiates the pointers GL with light and also does not irradiate the mechanism for driving the pointers GL with light.

Because of such a configuration, when the light emitting member 6 emits light, the pointers GL are recognized, but when the light emitting member 6 does not emit light, the pointers GL are not recognized. Accordingly, the vehicular display apparatus 1 according to the third embodiment can provide a large-screen display like the second embodiment. In addition, a display example at the time when the light emitting member 6 does not emit light is similar to that of the second embodiment.

Thus, according to the vehicular display apparatus 1 according to the third embodiment, the first decorative member 5 can be prevented from becoming an obstacle in the case of displaying a screen thereby inhibiting a decrease in appearance, like the second embodiment. Also, like the second embodiment, a display by the whole liquid crystal display 3 etc. can be provided, and a larger-screen display can be provided.

Further, since the third embodiment includes an operating three-dimensional body such as the pointer GL as the first decorative member 5, a third dimension can be represented for the operating body as well as a stop body, and the appearance can be improved.

The disclosed subject matter has been described above based on the embodiments, but the disclosed subject matter is not limited to the embodiments described above, and changes may be made without departing from the gist of the disclosed subject matter. In addition, various techniques and features of each of the separate embodiments may be combined or removed from other different embodiments and remain within the possible scope of the disclosed subject matter.

For example, the first decorative member 5 may be not only the member for reflecting light from the light emitting member 6 but also a member in which light from the light emitting member 6 is introduced and the introduced light is spread to the whole first decorative member 5 and it is visually recognized as if the first decorative member 5 itself emits the light.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular display apparatus for use with a vehicular instrument panel of a vehicle and which provides a display for a vehicular crew, the apparatus comprising:
    a liquid crystal display configured to project an image toward a back of the vehicle,
    a half mirror located at a back side of the vehicle with respect to the liquid crystal display, the half mirror configured to transmit an image from the liquid crystal display to the back of the vehicle, and to reflect light from a direction intersecting with a front-back direction of the vehicle to the back of the vehicle,
    a first decorative member located at a side of the intersecting direction, and
    a light emitting member configured to irradiate light at least one of from and towards the first decorative member.

2. The vehicular display apparatus according to claim 1, further comprising
    a second decorative member located between the liquid crystal display and the half mirror, wherein
    when the light emitting member emits light, the first decorative member is represented as a member continuous with the second decorative member.

3. The vehicular display apparatus according to claim 2, wherein the second decorative member includes at least one ring member having a C shape, and
    the first decorative member includes at least one arcuate member with a length configured to join a C-shaped open portion of the second decorative member, and
    when the light emitting member emits light, the arcuate member is displayed in a manner so as to connect the C-shaped open portion of the ring member having the C shape to thereby display a ring having an O shape, and when the light emitting member does not emit light, one image display area by the liquid crystal display, in which an inside and an outside of the ring member having the C shape are joined through the C-shaped open portion is formed.

4. The vehicular display apparatus according to claim 3, wherein
    the second decorative member has two ring members, and
    the two ring members are arranged with the C-shaped open portions mutually facing each other, and
    the first decorative member has two arcuate members, and
    when the light emitting member emits light, the two arcuate members are displayed so as to connect the C-shaped open portions of the two ring members having the C shapes to thereby display two rings having O shapes, and when the light emitting member does not emit light, the one image display area is formed in regions of the insides of the two C-shaped ring members with the open portions facing mutually with respect to each other.

* * * * *